(Model.)
R. MELVIN.
TWINE HOLDER.
No. 280,060. Patented June 26, 1883.
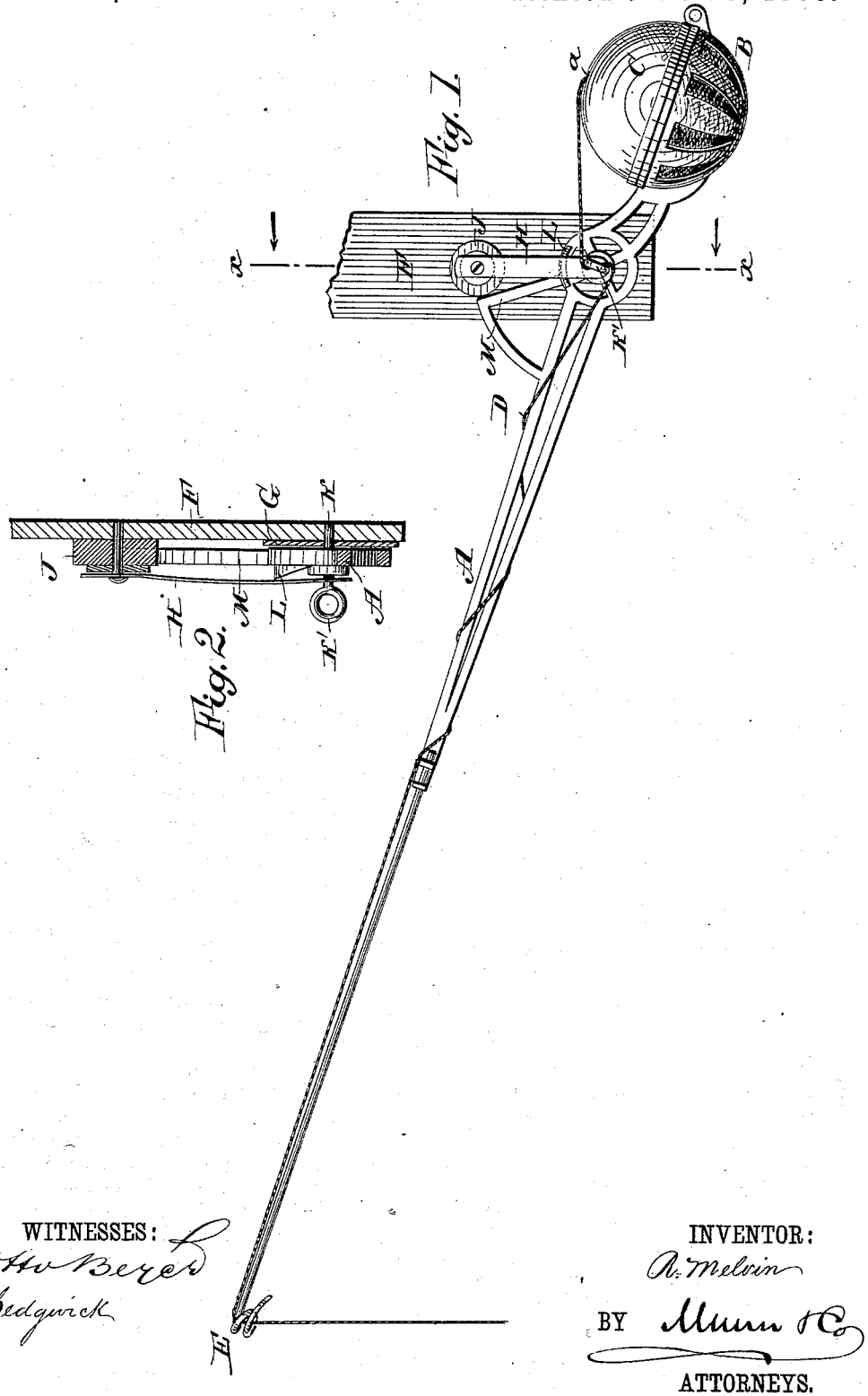
WITNESSES:
Otto Berger
C. Sedgwick
INVENTOR:
R. Melvin
BY Munn & Co
ATTORNEYS.

UNITED STATES PATENT OFFICE.

REUBEN MELVIN, OF CINCINNATI, OHIO.

TWINE-HOLDER.

SPECIFICATION forming part of Letters Patent No. 280,060, dated June 26, 1883.

Application filed April 20, 1883. (Model.)

*To all whom it may concern:*

Be it known that I, REUBEN MELVIN, of Cincinnati, in the county of Hamilton and State of Ohio, have invented a new and Improved Twine-Holder, of which the following is a full, clear, and exact description.

The object of my invention is to provide a new and improved device for holding a ball of twine in such a manner that the free end of the twine will be out of the way when not in use and can be easily drawn down when required.

The invention consists in a pivoted lever provided at one end with a spiral eye and at the other end with a twine-holding basket, which holds the eye end of the lever raised. The twine is coiled around the lever and passed through the spiral eye, from which the free end of the twine hangs. The lever is provided with a check-arm to prevent it from swinging upward too far, and with a beveled cam, resting against a spring, to prevent the lever from swinging upward too rapidly.

Reference is to be had to the accompanying drawings, forming part of this specification, in which similar letters of reference indicate corresponding parts in both the figures.

Figure 1 is a longitudinal elevation of my improved twine-holder. Fig. 2 is a cross-sectional elevation of the same on the line $x\,x$, Fig. 1.

An arm or lever, A, is provided at one end with a basket, B, for receiving a ball of twine, which basket has a hinged semi-spherical cover, C, provided with an aperture, $a$, through which the twine D passes. At the opposite end the lever is provided with a spiral eye, E, through which the twine can easily be passed without threading it—that is, the twine can be passed through the eye from the side. The lever A is pivoted near basket B to a board, F, projecting down from the ceiling, or to an arm, post, or any other suitable object, in such a manner that the weight of the basket and its cover and the ball of twine in the basket can hold the other end of the lever raised. The lever rests against a washer, G, secured on the board F or arm. A band-spring, H, is secured to a rubber or leather washer or disk, J, held on the board F, above the pivot K of the lever, which pivot K is provided with an eye, K′, and passes through the lower end of the spring H, and is provided with a screw, by means of which the tension can be adjusted, so that the spring will press with more or less force against the lever. The lever is provided near the pivot with a curved beveled cam, L, which projects toward the inner surface of the spring H, and increases in height from the basket end toward the other end of the lever. Near the pivot the lever is provided with an arm, M, adapted to strike against the washer J, to prevent the eye end of the lever from swinging too high. The twine is passed through the aperture $a$ in the cover C, through the eye K′, is then coiled around the lever A one or more times to increase the friction for holding the cord taut, and is finally passed through the eye E, from which the free end of the twine hangs. If the twine is to be used, its free end is pulled downward, whereby the long end of the lever is drawn downward. Then the required length of twine is drawn off, whereupon the twine is severed in any desired manner. As soon as the twine is severed the weight of the basket throws the long end of the lever upward and raises the free end of the twine, so that the same will be out of the way. As the lever rises the cam L is forced with increased pressure against the spring H, and thus the lever is prevented from rising too rapidly, whereby kinking of the free end of the cord is prevented. The arm $m$ strikes against the elastic washer J and prevents the long end of the lever from rising too high.

Having thus fully described my invention, I claim as new and desire to secure by Letters Patent—

1. A twine-holder constructed substantially as herein shown and described, and consisting of a pivoted lever, A, on one arm of which a twine-holding basket is secured, as set forth.

2. The combination, with the pivoted lever A, having an eye, E, at one end, of a twine-holding basket, P, secured on the opposite end of the lever, substantially as herein shown and described, and for the purpose set forth.

3. The combination, with the pivoted lever A, having an eye, E, at one end, of the basket B on the opposite end, and the hinged cover C, provided with an aperture, $a$, substantially as herein shown and described, and for the purpose set forth.

4. The combination, with the pivoted lever

A, having an eye, E, on one end, of the basket B on the opposite end, the arm M, and the washer J, against which the arm M can strike, substantially as herein shown and described, and for the purpose set forth.

5. The combination, with the pivoted lever A, having an eye, E, at one end, the twine-basket B on the opposite end, the spring H, and the cam L on the lever, substantially as herein shown and described, and for the purpose set forth.

6. The combination, with a pivoted lever, A, having an eye, E, at one end, the twine-basket B on the opposite end, the pivot K, having an eye, K', the spring H, and the cam L on the lever, substantially as herein shown and described, and for the purpose set forth.

REUBEN MELVIN.

Witnesses:
J. R. P. BROWN,
O. A. WILSON.